(12) United States Patent
Grover (10) Patent No.: US 12,200,301 B2
(45) Date of Patent: Jan. 14, 2025

(54) REPLACEMENT OF DIGITAL CONTENT IN DATA STREAMS

(71) Applicant: Roku, Inc., San Jose, CA (US)

(72) Inventor: Matthew George Grover, Cardiff (GB)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 17/846,477

(22) Filed: Jun. 22, 2022

(65) Prior Publication Data

US 2023/0421850 A1 Dec. 28, 2023

(51) Int. Cl.
*H04N 21/43* (2011.01)
*H04N 21/234* (2011.01)
*H04N 21/4363* (2011.01)
*H04N 21/44* (2011.01)
*H04N 21/454* (2011.01)

(52) U.S. Cl.
CPC ..... *H04N 21/454* (2013.01); *H04N 21/23418* (2013.01); *H04N 21/4363* (2013.01); *H04N 21/44016* (2013.01)

(58) Field of Classification Search
None
See application file for complete search history.

(56) References Cited

U.S. PATENT DOCUMENTS

| | | | |
|---|---|---|---|
| 9,146,990 B2 | 9/2015 | Scherf et al. | |
| 9,495,451 B2 | 11/2016 | Harron | |
| 9,992,533 B2 | 6/2018 | Lee et al. | |
| 10,506,275 B1 | 12/2019 | Thielen et al. | |
| 10,701,409 B1 | 6/2020 | Gupta | |
| 10,924,791 B2 | 2/2021 | Sullivan et al. | |
| 2009/0165031 A1* | 6/2009 | Li | G06F 21/10 725/22 |
| 2010/0037253 A1 | 2/2010 | Sheehan et al. | |
| 2013/0291082 A1* | 10/2013 | Giladi | H04L 63/08 726/7 |
| 2015/0163545 A1* | 6/2015 | Freed | H04N 21/8456 725/19 |
| 2015/0206172 A1 | 7/2015 | Lefevre | |
| 2016/0112760 A1 | 4/2016 | Kosseifi et al. | |
| 2020/0029108 A1 | 1/2020 | Dunker et al. | |
| 2020/0117979 A1 | 4/2020 | Sullivan et al. | |

(Continued)

*Primary Examiner* — Samira Monshi
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for replacing digital content. An example embodiment operates by detecting a segment of a data stream to be output by a media device and generating a fingerprint of digital content corresponding to the segment using automatic content recognition (ACR). The example embodiment further operates by comparing the fingerprint with a plurality of fingerprints of a plurality of digital content, identifying a matched fingerprint of a matched digital content, and comparing metadata of the matched digital content with metadata of a restricted digital content. The example embodiment further operates by determining that the digital content corresponding to the segment is blocked from being output by the media stream and replacing the digital content with new digital content in the segment.

17 Claims, 4 Drawing Sheets

(56) References Cited

U.S. PATENT DOCUMENTS

| | | |
|---|---|---|
| 2020/0169773 A1 | 5/2020 | Major |
| 2020/0213644 A1 | 7/2020 | Gupta et al. |
| 2021/0037253 A1 | 2/2021 | Zhang |
| 2021/0195260 A1 | 6/2021 | Major |
| 2021/0344983 A1* | 11/2021 | Mannion .......... H04N 21/44204 |
| 2022/0141518 A1 | 5/2022 | Grover et al. |
| 2023/0379532 A1 | 11/2023 | Grover et al. |

* cited by examiner

REPLACEMENT OF DIGITAL CONTENT IN DATA STREAMS

BACKGROUND

Field

This disclosure is generally directed to streaming video on-demand content and more particularly, to controlling the output of video on-demand content.

Background

Television streaming devices often allow users to consume video on-demand (VOD) or over-the-top (OTT) content. The VOD or OTT content is streamed from a server to the user's media device (e.g., streaming device). Oftentimes, the VOD or OTT content includes advertisements to be output along with the VOD or OTT content. However, certain advertisements may not be suitable to be consumed by particular individuals (e.g., advertisements about alcohol, weapons, violent movies/shows, etc.).

Since VOD or OTT content may be streamed over the Internet, conventional streaming devices do not provide for blocking or preventing the output of the advertisements when users are streaming VOD or OTT content. As such, streaming devices may find it difficult to comply with regulations or guidelines such as Children's Online Privacy Protection Act (COPPA).

SUMMARY

Provided herein are system, apparatus, article of manufacture, method and/or computer program product embodiments, and/or combinations and sub-combinations thereof, for replacing digital content in data streams.

An example embodiment operates by detecting a segment of a data stream to be output by a media device and generating a fingerprint of digital content corresponding to the segment using automatic content recognition (ACR). The example embodiment further operates by comparing the fingerprint with a plurality of fingerprints of a plurality of digital content stored in a database, identifying a matched fingerprint of the plurality of fingerprints of a matched digital content of the plurality digital content based on the comparison, and comparing metadata of the matched digital content with metadata of a restricted digital content. The example embodiment further operates by determining that the digital content corresponding to the segment is blocked from being output by the media stream based on the comparison and replacing the digital content with new digital content in the segment.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for replacing digital content in data streams.

Embodiments described herein provide for identifying digital content included in a data stream that is blocked to be output by a media system using Automatic Content Recognition (ACR) and replacing the blocked digital content with new digital content in the data stream. This prevents the output of unsuitable advertisements and seamlessly replaces the advertisements in video on-demand (VOD) or over-the-top (OTT) content streams.

Figure 1:
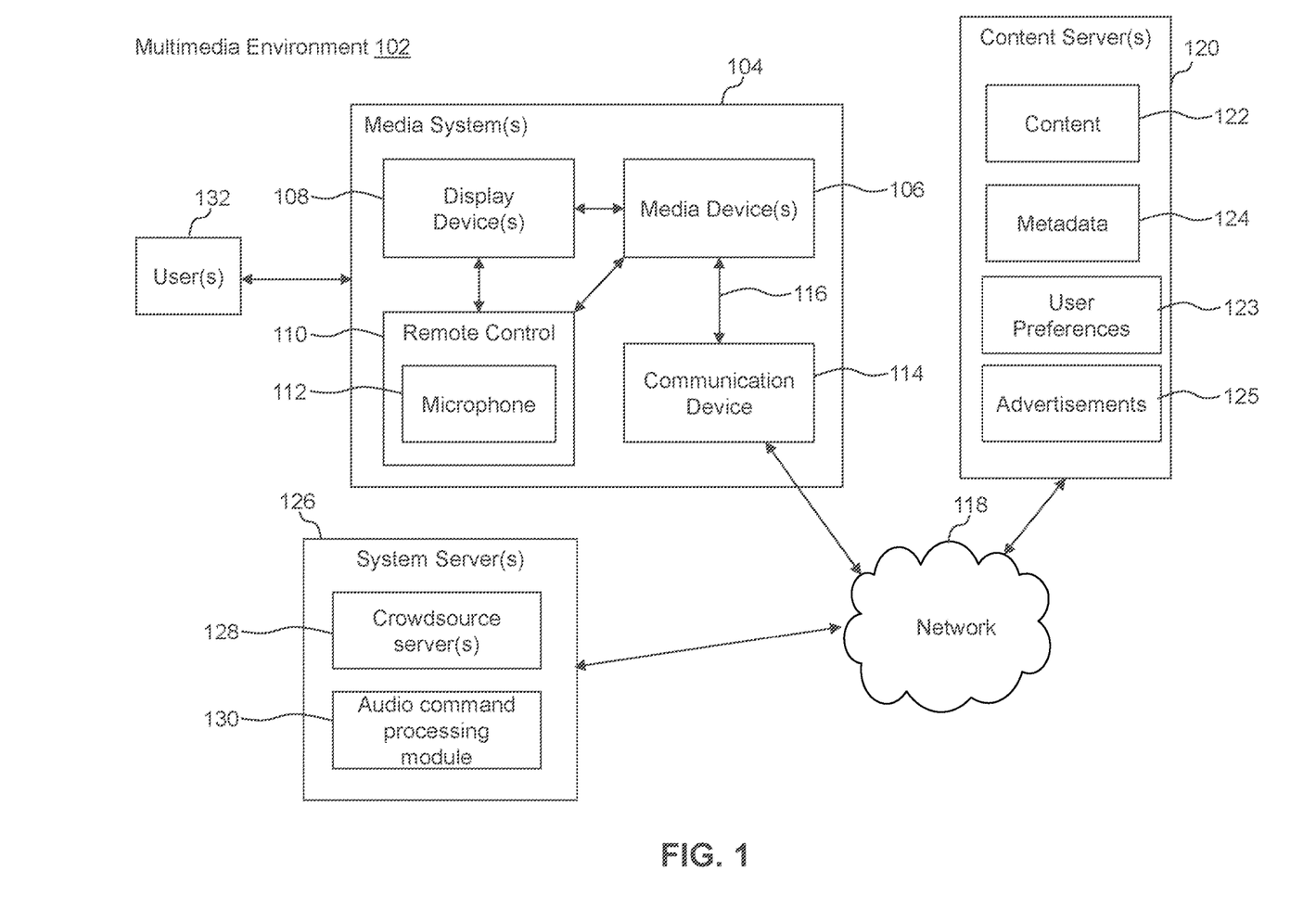
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, interne of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
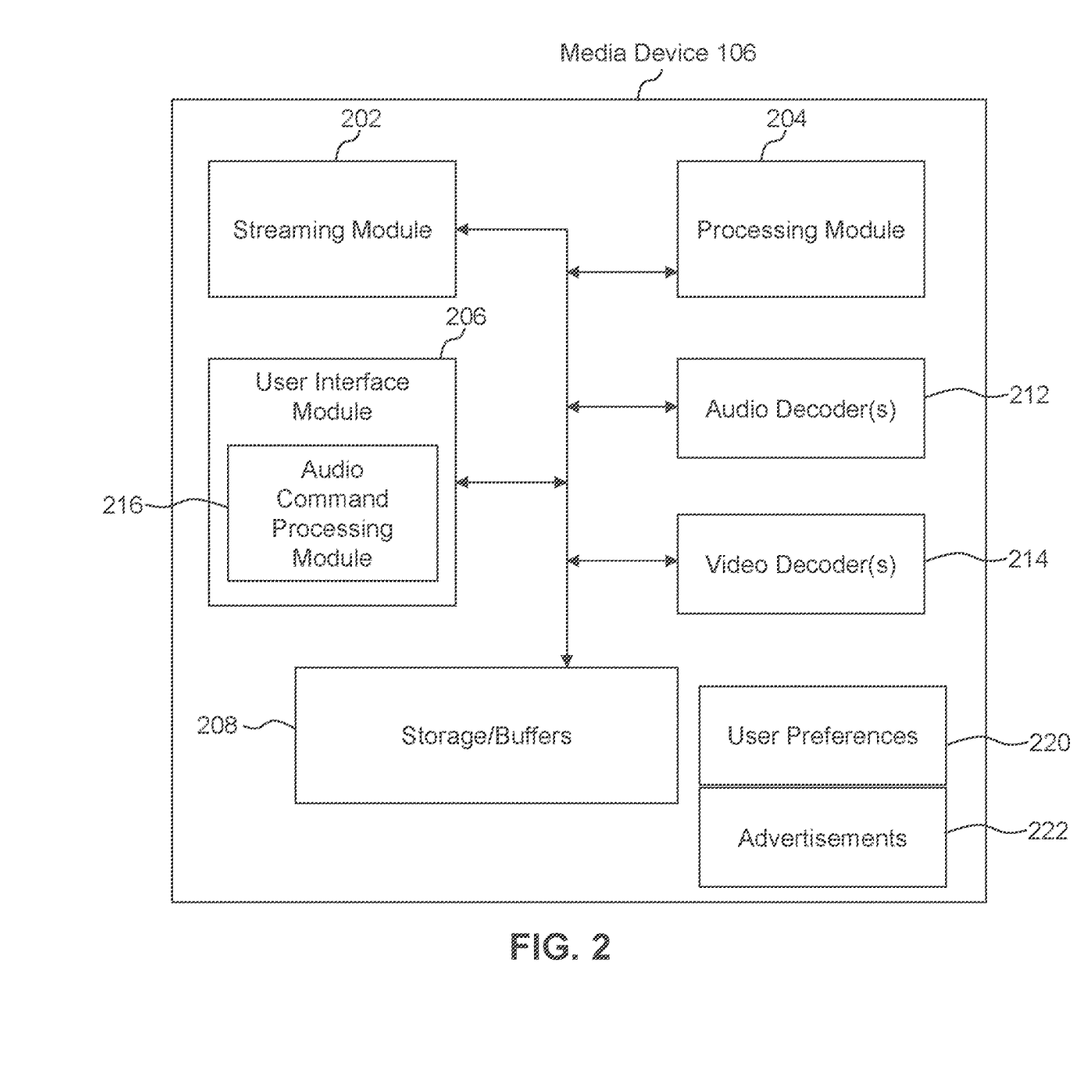
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Referring to FIG. 1, the media devices 106 may exist in thousands or millions of media systems 104. Accordingly, the media devices 106 may lend themselves to crowdsourcing embodiments. In some embodiments, one or crowdsource servers 128 in the system servers 126 operate to cause closed captioning to be automatically turned on and/or off during streamings of a given movie.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

Replacing Segments in Data Streams

As described above, media device 106 may be a streaming media device. Media device 106 may be configured to output over-the-air (OTA) content and VOD/OTT content. User 132 may request to consume VOD/OTT content. The VOD/OTT content may be TV shows, movies, sporting events, music, advertisements, etc. In response to user 132's request, media device 106 may request the VOD/OTT content via the Internet from content server 120. In some embodiments, media device 106 may request the VOD/OTT content from other servers 120.

Content server 120 may store the VOD/OTT content in content 122 as digital content. The digital content may be audio/video content of the TV shows, movies, sporting events, music, advertisements, etc. In response to receiving the request from media device 106, content server 120 may transmit segments of the requested VOD/OTT content to media device 106. For example, the VOD/OTT content may be made up of multiple segments. Content server 120 may transmit a predetermined number of segments at a time to media device 106 via the Internet. Each segment may contain a uniform resource locator (URL) to the requested VOD/OTT content stored in content server 120. The segments may be transmitted in the form of a data stream.

Media device 106 may receive the predetermined number of segments from content server 120. Media device 106 may access the digital content of the requested VOD/OTT content using the URL included in each segment. The segments may be in a playlist of segments. The playlist may be ordered in a first in, first out (FIFO) sequence. Media device 106 may process, buffer, and output the digital content, as described above with respect to FIG. 2. Media device 106 may output the digital content in the segments in the order of segments in the playlist. As media device 106 outputs a segment, additional segments are transmitted to the media device 106 by content server 120.

In some embodiments, user 132 may define user preferences with respect to the type of content to be output by media device 106. For example, user 132 may define parental restrictions for controlling the type of content that is output by media device 106. This may include categories of restricted content, such as content including drug use, alcohol, violence, sexual scenes, etc. The restrictions may also indicate particular days or times when the restrictions are to be implemented. The user preferences may be stored in user preferences 220 in media device 106 and/or in user preferences 123 in content server 120. User preferences 123 may store user preferences associated with multiple different user accounts associated with different media devices 106. User preferences 220 and 123 may also store metadata for digital content that is blocked or restricted to be output based on the user preferences. The metadata may also include metadata of advertisements that are blocked or restricted to be output based on the user preferences. The metadata may include name, type, category, and duration of the content, the digital content's restricted content, the content's age appropriateness, etc.

In some embodiments, advertisements may be included in the VOD/OTT content. Content server 120 may store advertisements in advertisements 125. Content server 120 may identify and include the advertisements to be included in the requested VOD/OTT content from advertisements 125. In this regard, a segment may include a URL for the advertisement. The URL may point to an advertisement in advertisements 125. In some embodiments, content server 120 may identify advertisements from a third-party advertisement server. The content server 120 may include the advertisements at various positions during the requested VOD/OTT content based on the requested VOD/OTT content's metadata.

User preferences stored in user preferences 123 or 220 may include restrictions for advertisements to be output by media device 106. For example, user 132 may want to block or restrict advertisements including violence, sex, drugs, alcohol, etc. Additionally, media device 106 may implement government regulations or guidelines (e.g., COPPA). Government regulations or guidelines may restrict advertisements, including content unsuitable for certain audiences.

Figure 3:
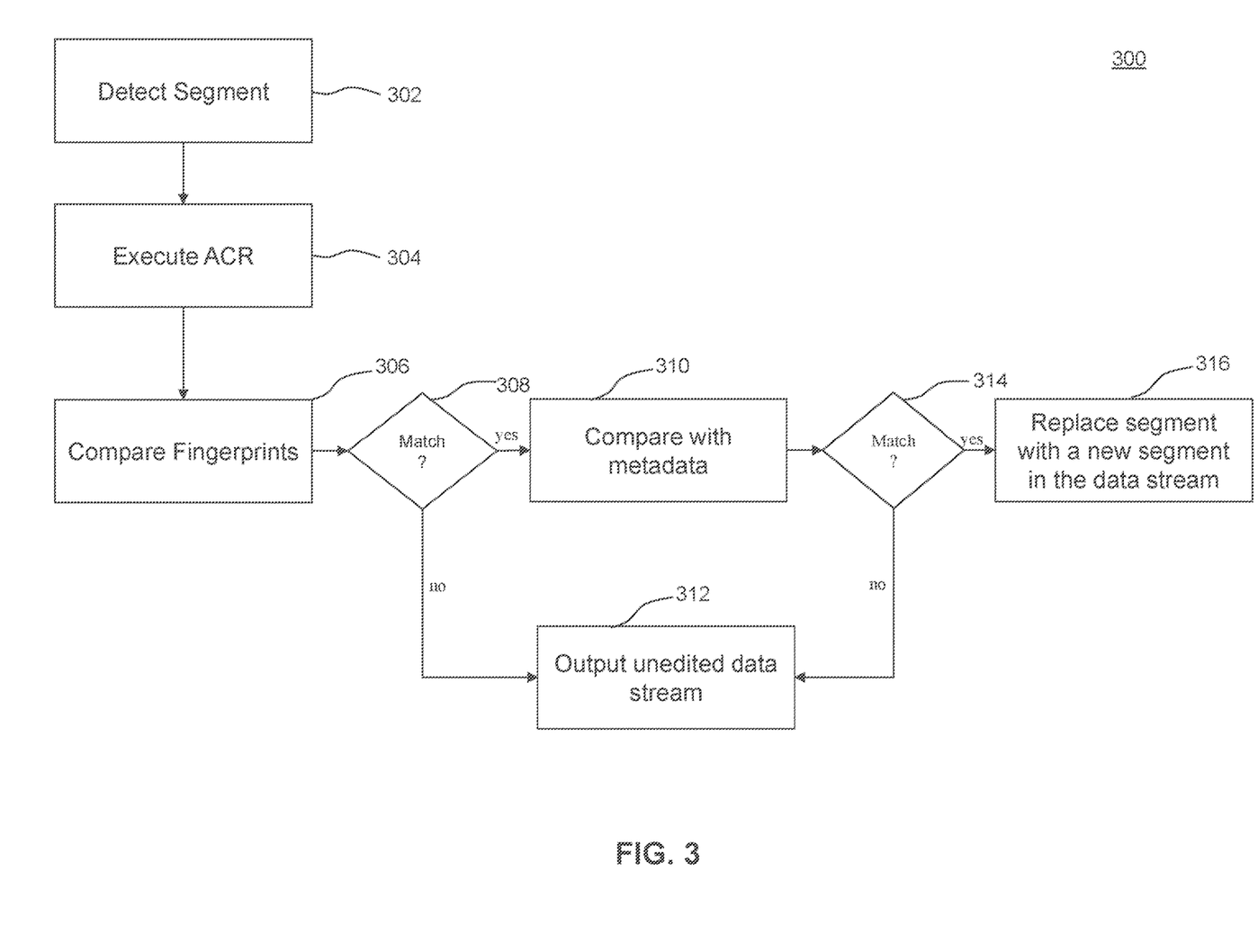
FIG. 3 is a flowchart illustrating a process for replacing digital content in a data stream, according to some embodiments.

FIG. 3 is a flowchart illustrating a process for replacing digital content in a data stream. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 3, as will be understood by a person of ordinary skill in the art.

Method 300 shall be described with reference to FIGS. 1-2. However, method 300 is not limited to that example embodiment.

In 302, a new segment to be output by media device 106 is detected in the playlist of segments. The new segment may be part of a requested VOD/OTT content. The new segment may include a URL for an advertisement to be output by media device 106. The advertisement may be digital content (e.g., audio/visual content). In some embodiments, media device 106 may detect the new segment when the new segment is received by media device 106. In other embodiments, content server 120 may detect the new segment before transmitting it to media device 106. Media device 106 or content server 120 may access the advertisement using the URL in the segment and its metadata.

In 304, ACR is executed the digital content of the advertisement to generate a fingerprint of the digital content. ACR is a technology to identify content played by media device 106. ACR may use fingerprinting or watermarking techniques to generate the fingerprint of the digital content. The fingerprinting/watermarking may be video or audio fingerprinting techniques. Video fingerprinting involves dimension reduction techniques which identify, extracts, and summarize characteristics of video of the digital content as a set of multiple perceptual hashes. Audio fingerprinting involves identifying the audio characteristics of the digital content. In some embodiments, content server 120 may execute the ACR on the advertisement's digital content to generate the digital content fingerprint. In other embodiments, processing module 204 of media device 106 may execute the ACR on the advertisement's digital content to generate the digital content's fingerprint.

In 306, the fingerprint is compared to fingerprints of other advertisements. The fingerprints of other advertisements may be stored in advertisements 125 or advertisements 222. In particular, advertisements 125 and advertisements 222 may store fingerprints of advertisements or other digital content. In some embodiments, content server 120 may compare the fingerprint of the advertisement in the new segment with the fingerprints of the other advertisements in advertisements 125. In other embodiments, processing module 204 of media device 106 may compare the fingerprint of the advertisement in the new segment with the fingerprints of the other advertisements in advertisements 222.

In 308, a determination is made whether the fingerprint of the advertisement in the new segment matches a fingerprint of an advertisement of the other advertisements. The advertisement for which the fingerprint matches the fingerprint of the advertisement in the new segment may be the matched advertisement. If a matched advertisement is identified, method 300 may proceed to 310.

In 310, metadata of the matched advertisement is compared to the metadata of advertisements that are to be blocked from output by media device 106 (e.g., restricted advertisements). The metadata of restricted advertisements may be stored in user preferences 123 or 220. In this regard, in some embodiments, content server 120 may compare the metadata of the matched advertisement to the metadata of restricted advertisements stored in user preferences 123. In other embodiments, processing module 204 of media device 106 may compare the metadata of the matched advertisement to the metadata of restricted advertisements stored in user preferences 220.

Turning back to 310, if the fingerprint of the advertisement in the new segment does not match a fingerprint of an advertisement of the other advertisements, method 300 may proceed to 312.

In 312, the digital content in the new segment is output by media device 106 unedited.

In 314, a determination is made whether the metadata of the matched advertisement matches the metadata of at least one restricted advertisement. If so, the advertisement in the new segment is determined to be blocked from output by media device 106. The advertisement may be referred to as the blocked advertisement. The fingerprint of the blocked advertisement may be stored in non-persistent or temporary memory (e.g., a cache) in media device 106. In the event, that the blocked advertisement is detected in a subsequent segment, media device 106 may use the fingerprint stored in the non-persistent or temporary memory to identify the blocked advertisement. Method 300 may proceed to 316.

In 316, the digital content of the blocked advertisement is replaced with new digital content of a new advertisement in the new segment. Content server 120 or media device 106 may identify a new advertisement using the metadata of the new advertisement. Moreover, content server 120 or media device 106 may identify the new advertisement that is suitable to be output by media device 106. Content server 120 or media device 106 may identify the new digital content of the new advertisement based on the duration of the new digital content being within a threshold length of the digital content of the blocked advertisement. Content server 120 or media device 106 may also identify the new advertisement based on the type of advertisement, geographic location of the user requesting the VOD/OTT content, advertisement user 132's demographic, suitable age for the advertisement, etc. Content server 120 or media device 106 may include the URL for the new advertisement in the new segment. The new digital content of the advertisement may be buffered so that it is ready for being output by media device 106. Media device 106 may access the new advertisement using the URL. Media device 106 may output the new advertisement.

Turning back to 314, if the metadata of the matched advertisement does not match the metadata of advertisements that are to be blocked from output by media device 106, method 300 may proceed to 312.

In 312, the digital content in the new segment is output by media device 106 unedited.

In some embodiments, method 300 may be executed for each new segment of a data stream of VOD/OTT content. In other embodiments, content server 120 or media device 106 may identify segments with advertisements before executing method 300.

Example Computer System

Figure 4:
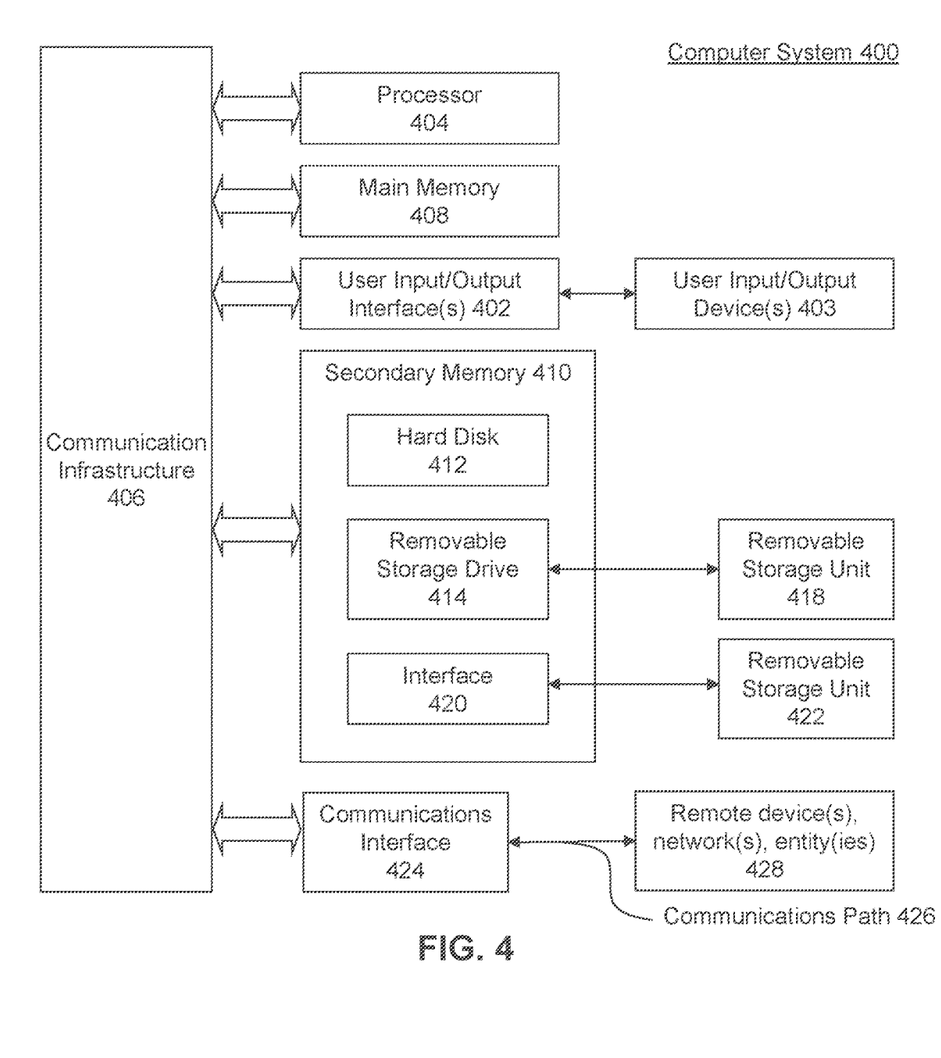
FIG. 4 illustrates an example computer system useful for implementing various embodiments.

Various embodiments may be implemented, for example, using one or more well-known computer systems, such as computer system 400 shown in FIG. 4. For example, the media device 106 and content server 120 may be implemented using combinations or sub-combinations of computer system 400. Also or alternatively, one or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400 or processor(s) 404), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for replacing digital content from a data stream, the computer-implemented method comprising:
   detecting a segment of the data stream to be output by a media device;
   generating a fingerprint of digital content corresponding to the segment using automatic content recognition (ACR);
   comparing the fingerprint with a plurality of fingerprints of a plurality of digital content stored in a database;
   in response to the fingerprint not matching the plurality of fingerprints, outputting the digital content by the media device;
   in response to the fingerprint matching one of the plurality of fingerprints, identifying a matched fingerprint of the plurality of fingerprints of a matched digital content of the plurality of digital content based on the comparison of the fingerprint with the plurality of fingerprints;
   in response to identifying the matched fingerprint, comparing metadata of the matched digital content with metadata of restricted digital content;
   determining that the digital content corresponding to the segment is blocked from being output by the media device based on the comparison of the metadata of the matched digital content with the metadata of the restricted digital content;
   identifying new digital content based on a first duration of the new digital content being within a threshold of a second duration of the digital content; and
   in response to determining that the digital content is blocked from being output by the media device, replacing the digital content with the new digital content in the segment to output the new digital content via the media device.

2. The computer-implemented method of claim 1, wherein the data stream is video on-demand (VOD) content or over-the-top (OTT) content being streamed to the media device from a content server.

3. The computer-implemented method of claim 1, wherein the new digital content includes a uniform resource locator (URL) to the digital content.

4. The computer-implemented method of claim 1, further comprising determining that the new digital content is suitable to be output by the media device based on preferences of a user associated with the media device.

5. The computer-implemented method of claim 1, further comprising storing the fingerprint of the segment in non-persistent memory.

6. The computer-implemented method of claim 1, further comprising buffering the new digital content before including the new digital content in the segment.

7. A system for replacing digital content from a data stream, the system comprising:
   one or more memories; and
   at least one processor, wherein each processor is coupled to at least one of the memories and configured to:
      detect a segment of the data stream to be output by a media device;
      generate a fingerprint of digital content corresponding to the segment using automatic content recognition (ACR);
      compare the fingerprint with a plurality of fingerprints of a plurality of digital content stored in a database;
      in response to the fingerprint not matching the plurality of fingerprints, output the digital content by the media device;
      in response to the fingerprint matching one of the plurality of fingerprints, identify a matched fingerprint of the plurality of fingerprints of a matched digital content of the plurality of digital content based on the comparison of the fingerprint with the plurality of fingerprints;
      in response to identifying the matched fingerprint, compare metadata of the matched digital content with metadata of restricted digital content;
      determine that the digital content corresponding to the segment is blocked from being output by the media device based on the comparison of the metadata of the matched digital content with the metadata of the restricted digital content;
      identify new digital content based on a first duration of the new digital content being within a threshold of a second duration of the digital content; and
      in response to determining that the digital content is blocked from being output, replace the digital content with the new digital content in the segment to output the new digital content via the media device.

8. The system of claim 7, wherein the data stream is video on-demand (VOD) content or over-the-top (OTT) content being streamed to the media device from a content server.

9. The system of claim 7, wherein the new digital content includes a uniform resource locator (URL) to the digital content.

10. The system of claim 7, wherein the processor is further configured to determine that the new digital content is suitable to be output by the media device based on preferences of a user associated with the media device.

11. The system of claim 7, wherein the processor is further configured to store the fingerprint of the segment in non-persistent memory.

12. The system of claim 7, wherein the processor is further configured to buffer the new digital content before including the new digital content in the segment.

13. A non-transitory computer-readable medium having instructions stored thereon that, when executed by at least one computing device, cause the at least one computing device to perform operations comprising:

detecting a segment of a data stream to be output by a media device;

generating a fingerprint of digital content corresponding to the segment using automatic content recognition (ACR);

comparing the fingerprint with a plurality of fingerprints of a plurality of digital content stored in a database;

in response to the fingerprint not matching the plurality of fingerprints, outputting the digital content by the media device;

in response to the fingerprint matching one of the plurality of fingerprints, identifying a matched fingerprint of the plurality of fingerprints of a matched digital content of the plurality of digital content based on the comparison of the fingerprint with the plurality of fingerprints;

in response to identifying the matched fingerprint, comparing metadata of the matched digital content with metadata of restricted digital content;

determining that the digital content corresponding to the segment is blocked from being output by the media device based on the comparison of the metadata of the matched digital content with the metadata of the restricted digital content;

identifying new digital content based on a first duration of the new digital content being within a threshold of a second duration of the digital content; and in response to determining that the digital content is blocked from being output, replacing the digital content with the new digital content in the segment to output the new digital content via the media device.

14. The non-transitory computer-readable medium of claim 13, wherein the data stream is video on-demand (VOD) content or over-the-top (OTT) content being streamed to the media device from a content server.

15. The non-transitory computer-readable medium of claim 13, wherein the new digital content includes a uniform resource locator (URL) to the digital content.

16. The non-transitory computer-readable medium of claim 13, wherein the operations further comprise determining that the new digital content is suitable to be output by the media device based on preferences of a user associated with the media device.

17. The non-transitory computer-readable medium of claim 13, wherein the operations further comprise storing the fingerprint of the segment in non-persistent memory.

* * * * *